US006527142B1

(12) United States Patent
Ikushima

(10) Patent No.: US 6,527,142 B1
(45) Date of Patent: Mar. 4, 2003

(54) LIQUID CONSTANT RATE DISCHARGE METHOD AND DEVICE

(75) Inventor: Kazumasa Ikushima, Mitaka (JP)

(73) Assignee: Musashi Engineering, Inc., Tokyo (JP)

( * ) Notice: Subject to any disclaimer, the term of this patent is extended or adjusted under 35 U.S.C. 154(b) by 0 days.

(21) Appl. No.: 09/807,416

(22) PCT Filed: Oct. 6, 1999

(86) PCT No.: PCT/JP99/05500

§ 371 (c)(1),
(2), (4) Date: Sep. 5, 2001

(87) PCT Pub. No.: WO00/24526

PCT Pub. Date: May 4, 2000

(30) Foreign Application Priority Data

Oct. 23, 1998 (JP) ............................... 10/302522
Oct. 29, 1998 (JP) ............................... 10/309179

(51) Int. Cl.[7] ................................... B67D 5/08
(52) U.S. Cl. .................... 222/61; 222/63; 222/309; 222/504
(58) Field of Search ............... 222/1, 146.1, 146.2, 222/146.5, 380, 386, 438, 504, 63, 61, 309; 427/421; 239/585.5

(56) References Cited

U.S. PATENT DOCUMENTS

| 4,753,375 A | | 6/1988 | Takei et al. .................. 222/447 |
| 4,850,514 A | * | 7/1989 | Scholl et al. ............. 222/146.5 |
| 5,207,352 A | * | 5/1993 | Porter et al. ..................... 222/1 |
| 5,747,102 A | * | 5/1998 | Smith et al. ..................... 222/1 |
| 5,800,867 A | * | 9/1998 | Matsunaga et al. ......... 427/421 |
| 6,060,125 A | * | 5/2000 | Fujii .......................... 427/421 |

FOREIGN PATENT DOCUMENTS

| JP | 04-049108 | 2/1992 |
| JP | 05-168996 | 7/1993 |
| JP | 08-001060 | 1/1996 |
| JP | 2508696 | 6/1996 |
| JP | 11-156266 | 6/1999 |

* cited by examiner

Primary Examiner—Philippe Derakshani
(74) Attorney, Agent, or Firm—Armstrong, Westerman & Hattori, LLP.

(57) ABSTRACT

The invention provide a liquid ejecting method and apparatus by which an ejection port of an ejection valve is mechanically opened and closed, and which can more positively shut off the liquid at the time of stopping the ejection of a liquid and can securely avoid a leakage of the liquid without a risk of breaking fillers.

14 Claims, 8 Drawing Sheets

(a)

(b)

LIQUID CONSTANT RATE DISCHARGE METHOD AND DEVICE

TECHNICAL FIELD

The present invention relates to a fixed-amount-of-liquid ejecting method and apparatus, which are suitably used for ejecting a liquid in a fixed amount, the liquid including a viscous fluid and a material having consistency.

BACKGROUND ART

Japanese Unexamined Patent Publication No. 4-49108, for example, discloses one example of a conventional fixed-amount-of-liquid ejecting apparatus for use in regularly or irregularly coating an electronic material on a board in the form of points and lines in semiconductor manufacturing processes. In a disclosed screw type ejecting apparatus, the amount of a liquid ejected through an ejection port is controlled in accordance with such a parameter as the speed and cycle time of rotation of a screw, etc. With the disclosed apparatus, the rotational speed and the stop timing of the screw are controlled with high accuracy. Therefore, the amount of the ejected liquid is stabilized and the ejection of the liquid in a fixed amount can be achieved even in a continuous ejection mode without being affected by the viscosity and fluidity of the liquid and the amount of the liquid present in a reservoir.

In the above prior art apparatus, however, the liquid is ejected and stopped respectively upon rotation and stoppage of the screw, and the ejection port is left in a physically open state during the time in which the ejection is stopped. This has raised the following problem, particularly in the case of the liquid having a low viscosity or the case of pressurizing the liquid in the reservoir. If there is a relatively large clearance between an outer peripheral surface of the screw and an inner peripheral surface of a screw housing, the liquid is not positively shut off at the time of stopping the ejection of the liquid, and the liquid tends to leak due to the own weight and a force applied to pressurize the liquid. On the other hand, if the clearance between the outer peripheral surface of the screw and the inner peripheral surface of the screw housing is set to a small value to overcome the above problem, another problem has arisen in that fillers, for example, mixed in the electronic material are broken.

DISCLOSURE OF THE INVENTION

With the view of solving the above-described problems experienced in the prior art, an object of the present invention is to provide a method and apparatus for ejecting a liquid, by which an ejection port of an ejection valve is mechanically opened and closed, and hence which can more positively shut off the liquid at the time of stopping the ejection of the liquid and can securely avoid a leakage of the liquid without a risk of breaking fillers.

In the method of ejecting a liquid in a fixed amount according to the present invention, when ejecting the liquid in the fixed amount from a liquid reservoir through an ejection valve, a pressure of the liquid supplied from the liquid reservoir to the ejection valve is controlled depending on the liquid pressure near an ejection port of the ejection valve, and the ejection port is mechanically opened and closed.

With the method of the present invention, when ejecting the liquid in a relatively small fixed amount, the pressure in a flow passage after the end of the ejection, particularly the pressure near the ejection port, is controlled to be kept at a predetermined specific value, whereby the subsequent ejection of the liquid can be always performed under the constant flow passage condition. Accordingly, by properly setting the force, time, etc. for pressurizing the liquid in the liquid reservoir, the ejection of the liquid in an amount corresponding to the set values can be repeatedly reproduced with high reliability.

On the other hand, when ejecting the liquid in a relatively large fixed amount, in addition to the above control, the pressure of the supplied liquid is controlled also during the ejection of the liquid based on the detected result of the liquid pressure in such a manner, for example, that variations of the detected pressure is kept as small as possible. Consequently, the liquid can be ejected in the fixed amount as intended.

Further, by mechanically opening the ejection port of the ejection valve in timed relationship with an increase of the force pressurizing the liquid in the liquid reservoir, the ejection of the liquid can be started without a time lag. In addition, at the end of the ejection, by controlling the ejection valve so as to offset an increase of the pressurizing force and mechanically closing the ejection port of the ejection valve, one cycle of ejecting the liquid in the fixed amount can be ended with positive shutting-off of the liquid without a risk of liquid leakage.

After one cycle of ejecting the liquid in the fixed amount has been ended, the liquid pressure in the flow passage is controlled to be kept at the predetermined specific value depending on the liquid pressure near the ejection port of the ejection valve in a similar way as described above.

The apparatus for ejecting a liquid in a fixed amount from a liquid reservoir according to the present invention comprises a liquid reservoir, means for pressurizing the liquid in the liquid reservoir directly or indirectly, an ejection valve communicating with the liquid reservoir and having an ejection port mechanically opened and closed, a pressure sensor for detecting a pressure of the liquid near the ejection port, and control means for controlling operation of the pressurizing means in accordance with a signal from the pressure sensor.

With the apparatus of the present invention, using a pressure signal and a pressurizing time signal supplied to the pressurizing means, the liquid in the liquid reservoir is pressurized for a time corresponding to the pressurizing time signal so that the liquid is held under a pressure corresponding to the pressure signal. Further, the ejection valve is opened in timed relationship with the operation of the pressurizing means. As a result, the ejection of the liquid can be started without a time lag.

At the time when the time during which the liquid is pressurized by the pressurizing means reaches a predetermined time and the amount of the ejected liquid reaches a predetermined amount, the ejection valve is mechanically closed in timed relationship with the stop operation of the pressurizing means. The ejection port of the ejection valve is thereby physically closed. Therefore, the liquid is positively shut off and an accidental leakage of the liquid after that can be perfectly prevented.

After one cycle of ejecting the liquid in the fixed amount has been ended, the liquid pressure near the ejection port is detected by the pressure sensor, and a detected pressure signal at this time is inputted to the control means. In accordance with the input signal, the control means controls the pressurizing means to raise or lower the liquid pressure so that the residual liquid pressure near the ejection port becomes the predetermined specific value. It is a matter of course that if the detected liquid pressure coincides with the predetermined specific value, the pressurizing means is not required to be operated again.

By always keeping the liquid pressure near the ejection port and hence the pressure in the liquid flow passage at the constant values after the end of the ejection as described above, variations of the flow passage condition are eliminated. At the time of starting the next cycle of ejecting the liquid in the fixed amount, the force, time, etc. for pressurizing the liquid can be determined with no need of taking into account indefinite factors. In addition, the liquid can be ejected in the fixed amount with high accuracy.

When one cycle of liquid ejection is continued for a relatively long time as experienced, for example, when the liquid is coated in the linear form, it is preferable that the pressure detection by the pressure sensor is also performed during the ejection and the liquid pressurizing force applied from the pressurizing means is controlled in accordance with the detected result.

In the apparatus of the present invention, preferably, the ejection valve comprises a needle valve. Since the size of a needle can be made in itself sufficiently small, the needle can be smoothly and quickly displaced to open and close by a relatively small driving force even under a high pressure on the order of, for example, 100–200 kgf/cm$^2$. It is therefore possible to shut off the liquid more positively at the end of the ejection, and to eliminate a time lag more effectively at the start of the ejection.

In addition, since the required driving force is relatively small, the overall size of the ejection valve can be reduced.

More preferably, the needle valve is provided with a liquid pressure compensating piston.

With the above feature, the apparatus can operate so as to compensate pressure variations in the liquid passage, particularly at and near the ejection port, more easily, quickly and accurately in combination with back and forth movement of the liquid pressure compensating piston. One example of the combined operation is as follows. When the needle valve is opened, the volume occupied by the needle in an area near the ejection port is reduced. Conversely, when the needle valve is closed, the volume occupied by the needle in the area near the ejection port is increased. In the former case, a decrease of the liquid pressure near the ejection port can be prevented by moving forth the liquid pressure compensating piston. In the latter case, an increase of the liquid pressure near the ejection port can be prevented by moving back the liquid pressure compensating piston.

Accordingly, the liquid pressure compensating piston can be employed in addition to or in place of the pressurizing means for the purpose of controlling the residual liquid pressure to the predetermined specific value after the end of the ejection.

Further, when an ejection nozzle requires to be moved relative to a workpiece in the apparatus of the present invention, the ejection nozzle is preferably mounted to a manipulator which is based on the Cartesian coordinate system and enables the ejection nozzle to be displaced in three dimensional directions. More preferably, the manipulator is controlled in synchronous relation to control of the pressurizing means and control of the ejection valve.

According to the present invention, as will be apparent from the above description, since the ejection port of the ejection valve is mechanically opened and closed, positive shutting-off of the liquid at the time of stopping the ejection of the liquid can be more securely achieved without breaking fillers which are sometimes mixed in the liquid, and a leakage of the liquid through the ejection port can be prevented sufficiently.

Additionally, by setting the bore diameter of an air cylinder, which serves as means for pressurizing the liquid, to be much larger than the inner diameter of the liquid reservoir, the liquid pressure can be raised up to a required level even when the line air pressure in a general factory is relatively low. As a result, efficiency of the liquid ejecting work can be improved as intended.

BEST MODE FOR CARRYING OUT THE INVENTION

Embodiments of the present invention will be described below with reference to the drawings.

Figure 1:
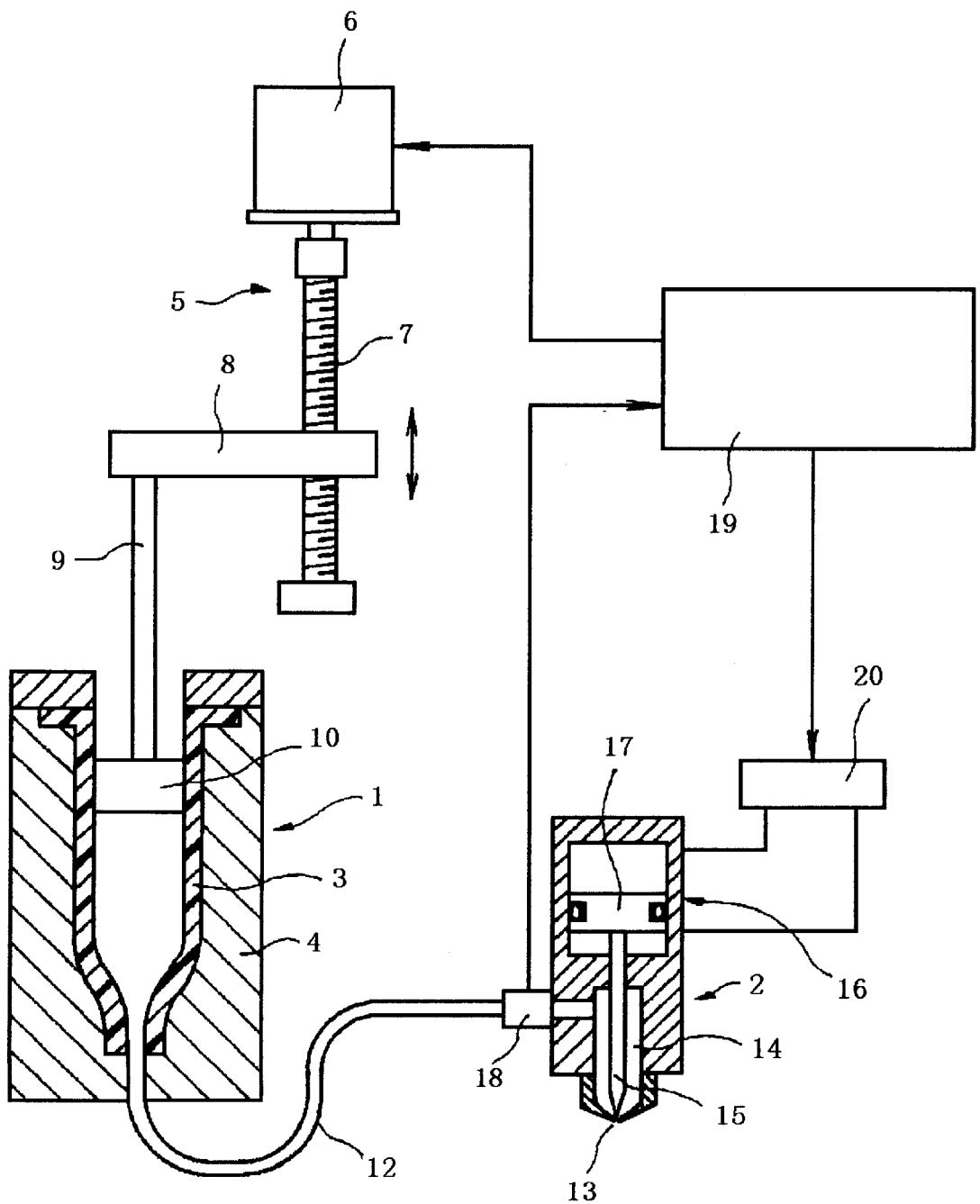
FIG. 1 is a schematic view, sectioned in principal part, of one embodiment of a method and apparatus for ejecting a liquid in a fixed amount according to the present invention in which a screw transmission device is employed as pressurizing means.

FIG. 1 is a schematic view, sectioned in principal part, of a method and apparatus for ejecting a liquid in a fixed amount according to the present invention. In FIG. 1, reference numeral 1 denotes a liquid reservoir, and 2 denotes a needle valve serving as an ejection valve.

The liquid reservoir 1 comprises a syringe 3 which can be made of a synthetic resin, for example, and a holder 4 surrounding the syringe 3 in contact relation from the outer side so as to hold it. The syringe 3 is detachably attached to the holder 4.

A pressurizing means 5 for pressuring a liquid in the liquid reservoir 1 to a required level of pressure is constructed such that a ball screw 7 is mounted to an output shaft of a motor 6, a female screw member 8 is meshed with the ball screw 7 to be movable up and down with rotation of the ball screw 7, and a plunger 10 is coupled to the female screw member 8 through a rod 9. The plunger 10 is preferably held in liquid tight contact with an inner surface of the syringe 3.

The needle valve 2 connected to the liquid reservoir 1 through a liquid flow passage 12 comprises an outlet space 14 communicating with the liquid flow passage 12 and leading to an ejection port 13, a needle 15 movable back and forth in to outlet space 14 to thereby open and close the ejection port 13, and a double-acting cylinder 16 for moving the needle 15 back and forth. The needle 15 is coupled at its rear end to a piston 17 of the cylinder 16.

At a position near the ejection port 13, i.e., at a portion where the needle valve 2 is connected to the flow passage 12 in the illustrated arrangement, a pressure sensor 18 is disposed to detect the pressure of the liquid in the flow passage 12. A detection signal from the pressure sensor 18 is inputted to a control means 19.

The control means 19 in this embodiment functions to control the operation of the motor 6 in accordance with a detection result of the pressure sensor 18 so that the liquid pressure in the flow passage 12, particularly in the position near the ejection port 13, is held at a predetermined particular value when the ejection of the liquid is stopped, more preferably also when the liquid is ejected. Another function of the control means 19 is to control the speed and cycle time of rotation of motor 6, etc. at the time when the liquid is ejected, as well as the operation of a selector valve 20 for the needle valve 2.

With the apparatus thus constructed, the liquid is ejected in a fixed amount as follows. In accordance with the pressure detected by the pressure sensor 18, for example, the control means 19 operates the motor 6 to move the plunger 10 up and down in the syringe 3, whereby the liquid pressure in the flow passage 12 is held at the predetermined particular value. As a result, a flow passage condition before the start of ejection of the liquid is always kept constant.

Subsequently, with an ejection start signal and an ejection pressure signal outputted from the control means 19, the motor 6 is rotated at a constant predetermined speed to pressurize the liquid in the syringe 3 to the required level of pressure, and the piston 17 of the syringe 16 and hence the needle 15 are moved back in timed relationship with the operation of the motor 6. The ejection port 13 is thereby opened to start the ejection of the liquid through the ejection port 13.

When the liquid is ejected for a relatively long period of time, it is preferable to improve the accuracy of liquid ejection in a fixed amount that the liquid pressure is also detected during the ejection of the liquid, and the detected result is fed back to the control process for the operation of the motor 6 to regulate the speed of rotation thereof, etc.

At the time when a predetermined time corresponding to the ejection of the liquid in a predetermined amount has lapsed, the control means 19 outputs an ejection end signal to each of the motor 6 and the selector valve 20, thereby stopping the rotation of the motor 6 and closing the needle valve 2 at the same time. One cycle of ejecting the liquid in a fixed amount is thereby completed.

With the above arrangement, it is always ensured regardless of the magnitude of the liquid pressure that, particularly, the needle 15 of the needle valve 2 is operated to move forth smoothly and quickly for mechanically closing the ejection port 13. It is therefore possible to achieve good shutting-off of the liquid, to realize complete closing of the ejection port 13, and to avoid an accidental leakage of the liquid sufficiently.

Figure 2:
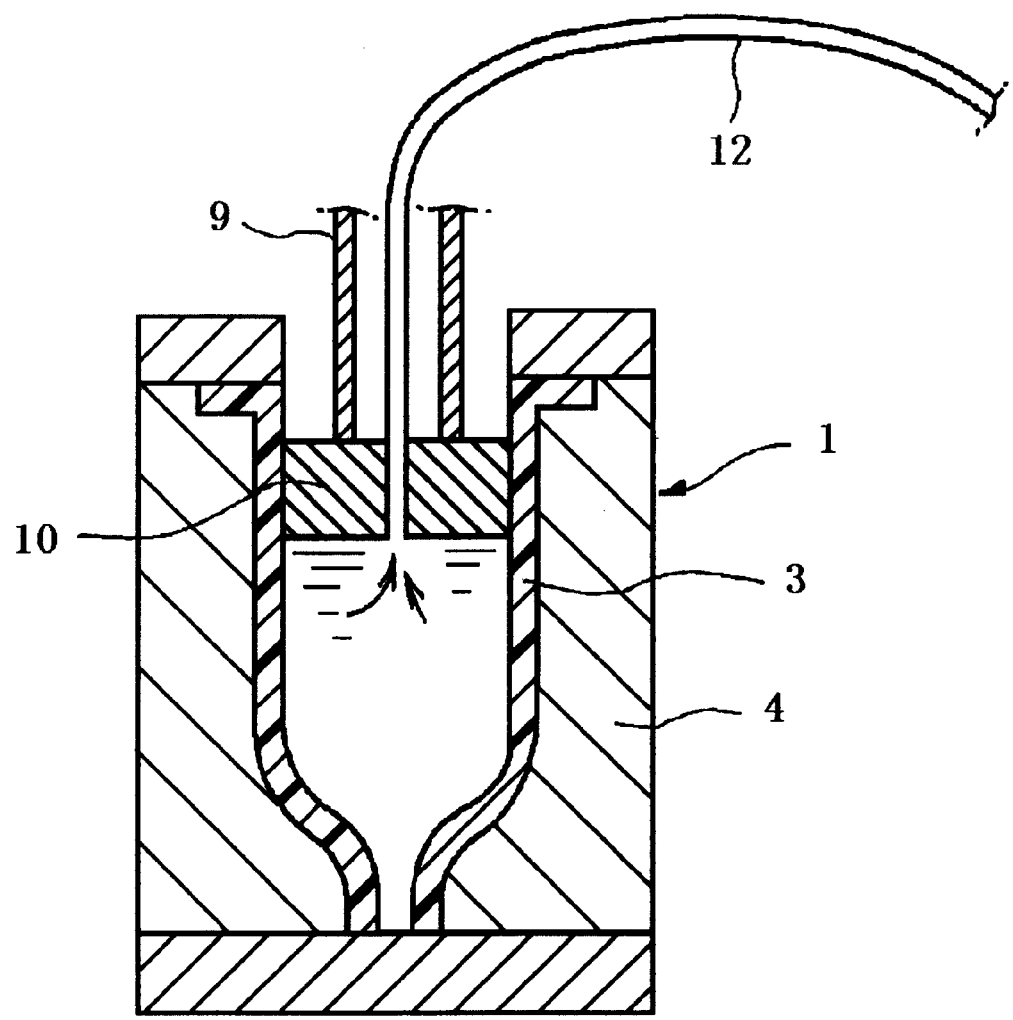
FIG. 2 is a sectional view showing another embodiment of a liquid flow passage and a plunger extended for use with a liquid reservoir in the present invention.

FIG. 2 is a sectional view showing another embodiment of the liquid flow passage and the plunger. In this embodiment, the liquid flow passage 12 is formed to extend upwardly of the liquid reservoir 1 after penetrating the plunger 10. The liquid flow passage 12 in this embodiment is suitably used for a liquid containing many precipitates in point of effectively preventing the precipitates being ejected with the liquid.

Figure 3:
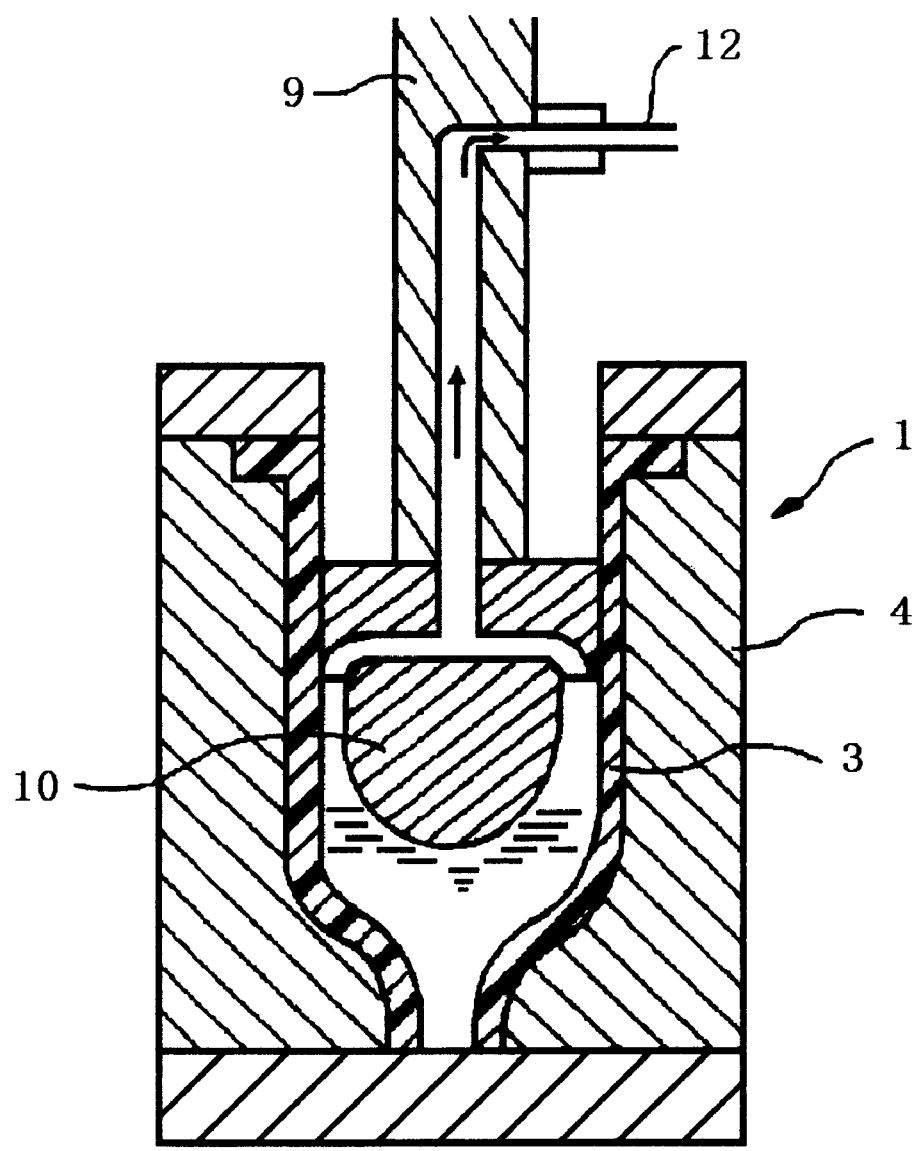
FIG. 3 is a sectional view showing still another embodiment of the liquid flow passage and a plunger for use with the liquid reservoir in the present invention.

FIG. 3 is a sectional view showing still another embodiment of the liquid flow passage and the plunger. In this embodiment, a lower surface of the plunger 10 is formed to have a configuration similar to the bottom shape of the syringe 3.

With this embodiment, a space remaining in the syringe when the plunger 10 is fully descended to a lower limit position can be reduced, and therefore the consumption efficiency of the liquid can be increased. Further, by opening the liquid flow passage 12 at the side of the plunger 10 as shown, sealed air can be more easily and surely discharged toward the valve.

Figure 4:
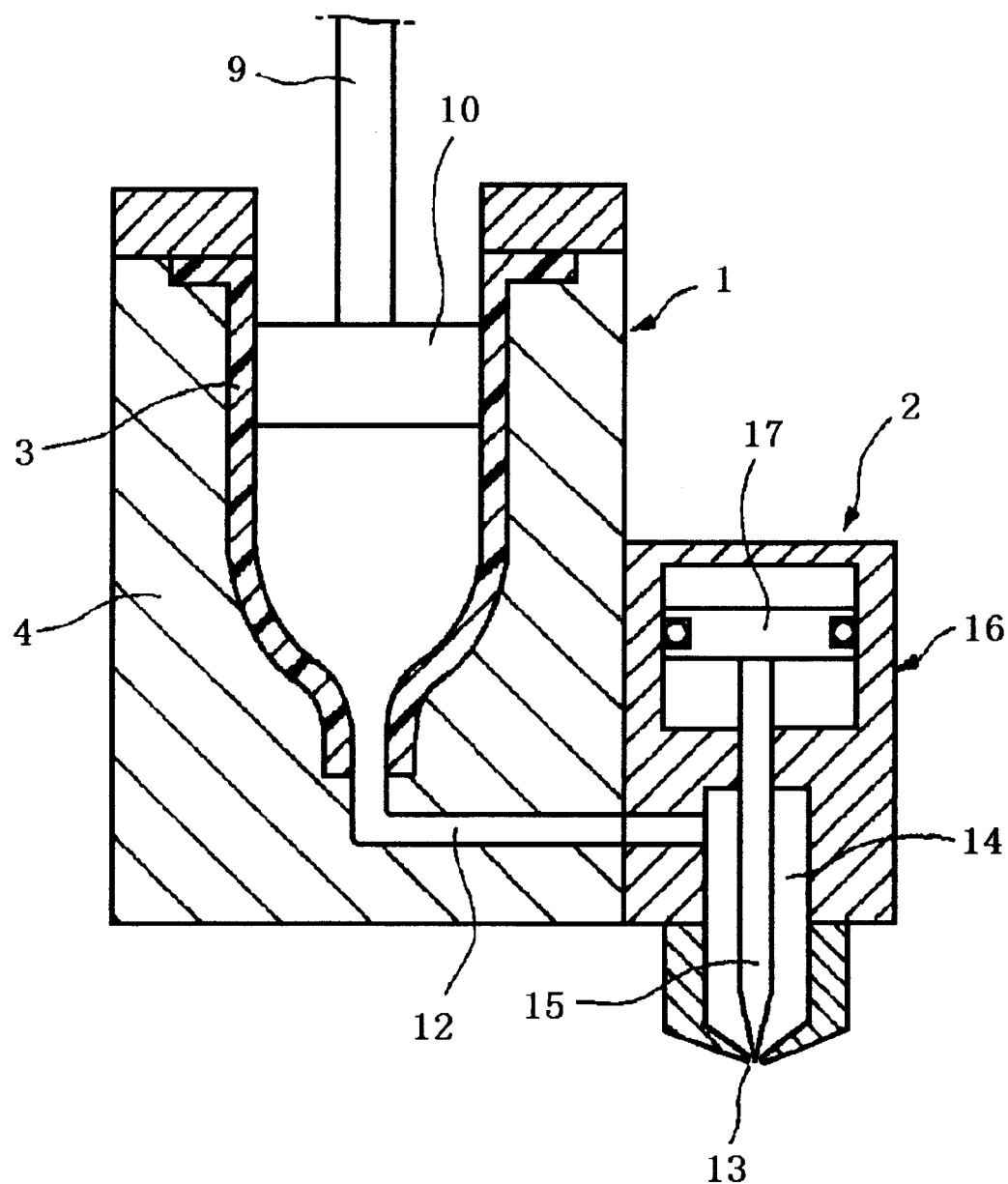
FIG. 4 is a sectional view showing another embodiment of arrangement of the liquid reservoir and a needle valve used in the present invention.

FIG. 4 is a sectional view showing another embodiment of arrangement of the liquid reservoir and the needle valve.

In this embodiment, the liquid flow passage 12 is formed in the body of the holder 4 of the syringe 3 to be communicated with a lower end opening of the syringe 3 and an inner passage of the needle valve 2. With this embodiment, the liquid reservoir 1 and the needle valve 2 is constructed into a one-piece structure and therefore a tube for forming a flow passage between the liquid reservoir 1 and the needle valve 2 is no longer required. As a result, it is possible to prevent a pressure response from lowering due to a long flow passage between them.

Figure 5:
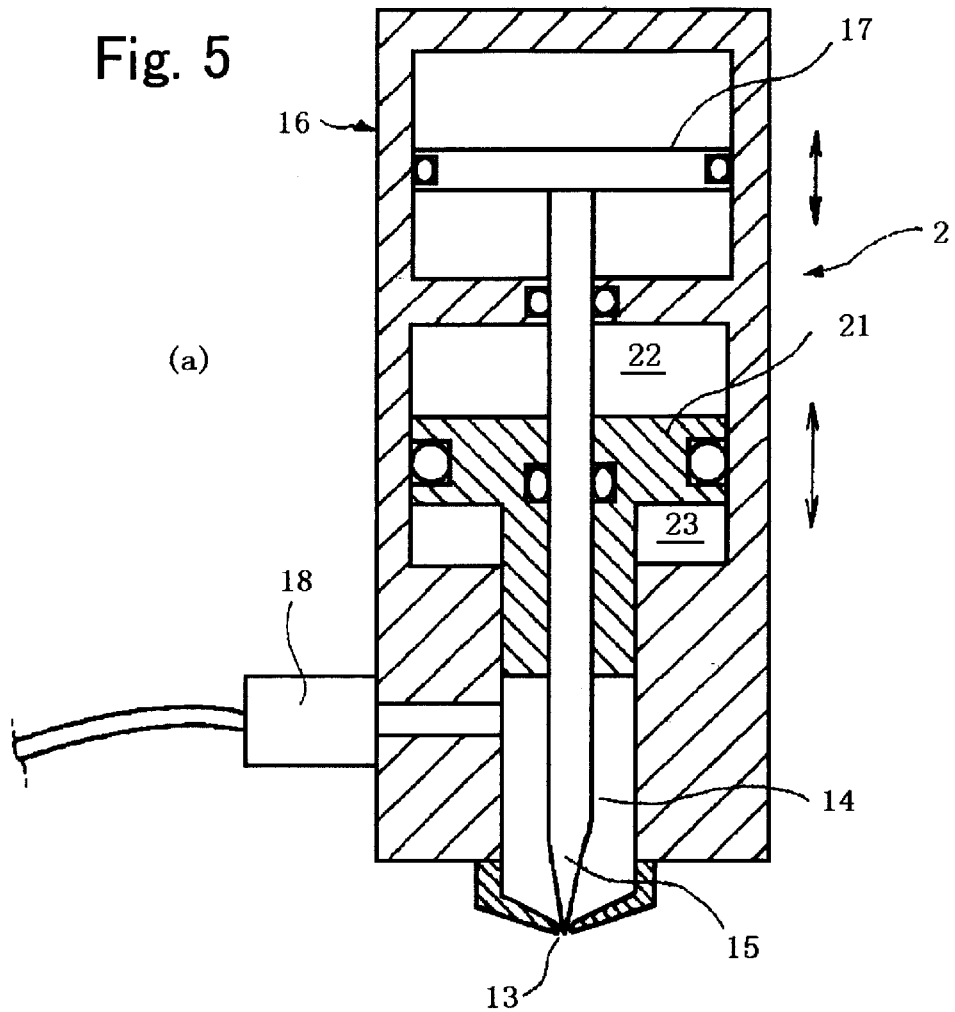
FIG. 5 is a sectional view showing another embodiment of the needle valve used in the present invention.
Figure 5:
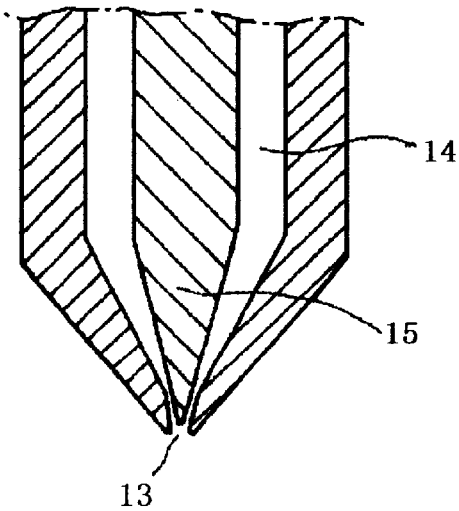

FIG. 5 is a sectional view showing another embodiment of the needle valve 2.

In the needle valve 2 of this embodiment, a liquid pressure compensating piston 21 for defining the outlet space 14 is disposed independently of the double-acting cylinder 16 between the outlet space 14 and a cylinder space for actuating the piston 17. The liquid pressure compensating piston 21 functions as follows. When the piston 21 is moved forth (downward) with a pressurized fluid, e.g., pressurized air, supplied to a chamber 22 on the same side as the cylinder space, the volume of the outlet space 14 is reduced. On the other hand, when pressurized air is supplied to a chamber 23 on the same side as the outlet space 14, the volume of the outlet space 14 is increased.

Accordingly, the predetermined liquid pressure can be realized by moving the liquid pressure compensating piston 21 forth to some extent when the liquid pressure near the ejection port 13 is lower than the predetermined value, and by moving the liquid pressure compensating piston 21 back to some extent when the liquid pressure near the ejection port 13 is higher than the predetermined value.

For example, minute pressure variations can be effectively compensated as follows. A lowering of the liquid pressure due to a reduction of the volume occupied by the needle 15 in the outlet space 14, which occurs when the needle 15 is moved back at the time of starting the ejection of the liquid, can be absorbed by moving the liquid pressure compensating piston 21 forth. Conversely, a rising of the liquid pressure due to an increase of the volume occupied by the needle 15 in the outlet space 14, which occurs when the needle 15 is moved forth at the time of stopping the ejection of the liquid, can be absorbed by moving the piston 21 back.

To more positively shut off the liquid in each of the needle valve shown in FIG. 5 and the needle valve in the above embodiments at the time when the ejection port 13 is closed, it is preferable that the length of a portion of the ejection port wall, which projects downward from a position where the needle 15 is seated against it, be as small as possible to make substantially zero the amount of the liquid remaining in the ejection port 13 after the ejection port 13 has been closed.

The thus-constructed apparatus for ejecting a liquid in a fixed amount can be used while the position of the needle valve 2 serving as the ejection valve is held stationary, when a workpiece, i.e., an object on which the liquid is coated, is properly moved in timed relationship with the ejection of the liquid.

On the other hand, when a workpiece is fixedly place at a particular positioned, the needle valve 2 must be moved to a required position and a required direction.

Figure 6:
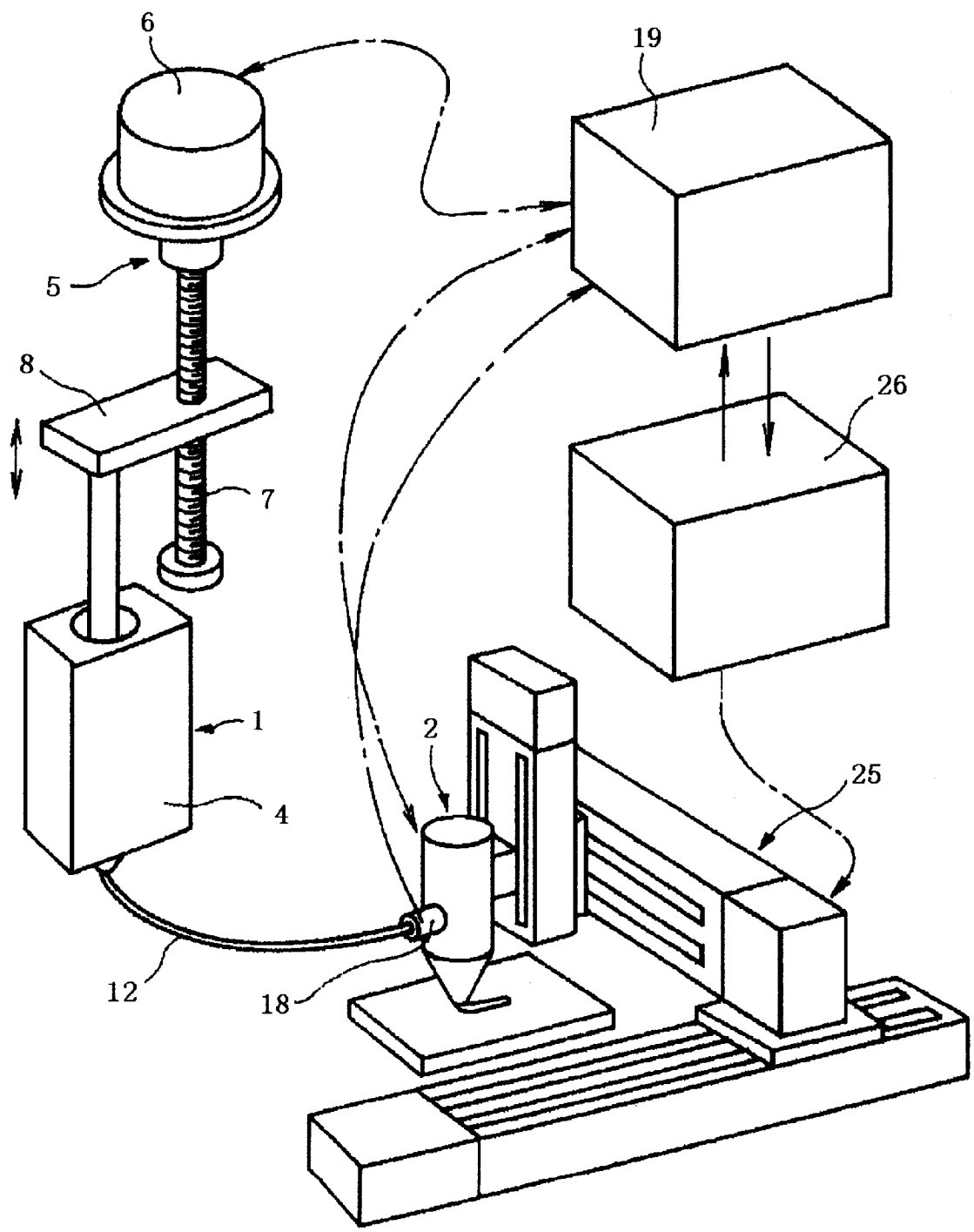
FIG. 6 is a schematic perspective view showing an embodiment in which the present invention is applied to a three-dimensional manipulator.

FIG. 6 shows an embodiment that is adapted for such a case. In this embodiment, the needle valve 2 is mounted to a three-dimensional manipulator 25 based on the Cartesian coordinate system, and the three-dimensional manipulator 25 is operated by a controller 26 which outputs a position signal in accordance with a signal from the control means 19. The ejection port 13 of the needle valve 2 is thereby moved to a desired position in the three-dimensional coordinate system. The apparatus of this embodiment can provide good coating efficiency when employed for workpieces that are fed at a predetermined rate (tact) with a conveyor.

Figure 7:
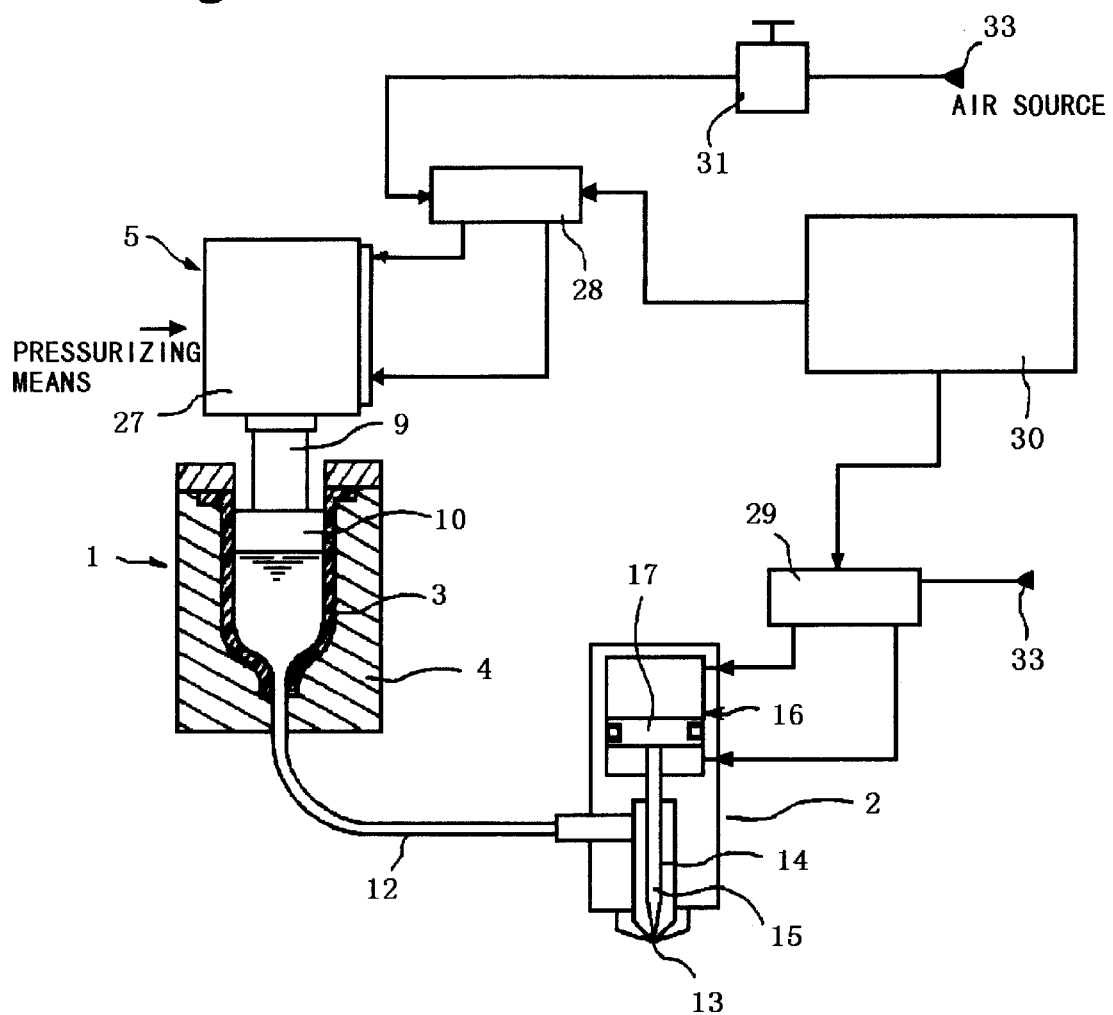
FIG. 7 is a schematic view, sectioned in principal part, of another embodiment of the method and apparatus for ejecting a liquid in a fixed amount according to the present invention in which an air cylinder is employed as pressurzing means.

FIG. 7 is a schematic view, sectioned in principal part, of another embodiment of the method and apparatus for ejecting a liquid in a fixed amount according to the present invention. In FIG. 7, denoted by reference numeral 1 a liquid reservoir, and 2 is a needle valve serving as an ejection valve.

The liquid reservoir 1 comprises a syringe 3 which can be made of a synthetic resin, for example, and a holder 4 surrounding the syringe 3 in contact relation from the outer side so as to hold it. The syringe 3 is attached to the holder 4 in such a manner that it may be detached if necessary.

A pressurizing means 5 for pressuring a liquid in the liquid reservoir 1 to a required level of pressure is constructed by an air cylinder 27 having a bore diameter about 2 to 10 times the inner diameter of the syringe 3. The plunger 10 is attached to the fore end of a piston rod 9 of the air cylinder 27, and is preferably held in liquid tight contact with an inner surface of the syringe 3 while it is allowed to move into the syringe 3.

The needle valve 2 connected to the liquid reservoir 1 through a liquid flow passage 12 comprises an outlet space 14 communicating with the liquid flow passage 12 and leading to an ejection port 13, a needle 15 movable back and forth in the outlet space 14 to thereby open and close the ejection port 13, and a double-acting cylinder 16 for moving the needle 15 back and forth. The needle 15 is coupled at its rear end to a piston 17 of the cylinder 16.

Further, the air cylinder 27, which may also be of the double-acting type, and the double-acting cylinder 16 are connected respectively to solenoid selector valves 28, 29. The solenoid selector valves 28, 29 are connected to a control means 30 for controlling the operation of the valves 28, 29 in accordance with predetermined signals inputted to the control means 30. In addition, one solenoid selector valve 28 for controlling supply and discharge of pressurized air to and from the air cylinder 16 is connected to a pressurized air supply source 33 through, e.g., a manual pressure reducing valve 31, whereas the other solenoid selector valve 29 is directly connected to the pressurized air supply source 33.

In the operation of the thus-constructed apparatus of this embodiment for ejecting a liquid in a fixed amount, a signal is outputted to the solenoid selector valve 28 from the control means 30, whereupon the pressurized air is supplied to the air cylinder 27 at a pressure set by the manual pressure reducing valve 31, thereby moving the plunger 10 downward with a required force. In timed relationship with the above operation, a signal is outputted to the solenoid selector valve 29 from the control means 30, whereupon the needle valve 2 is opened and the liquid pressurized to a required level of pressure is ejected through the ejection port 13 for a certain period of time that is specified depending on an opening area of the ejection port 13. As a result, the liquid can be ejected in a fixed amount with high accuracy without a time lag.

At the end of the ejection of the liquid in a fixed amount, an ejection end signal is sent to each of the solenoid selector valves 28, 29 from the control means 30, whereupon the supply of the pressurized air to the air cylinder 27 is stopped, and at the same time the ejection port 13 of the needle valve 2 is mechanically closed by the needle 15 with certainty. An outflow of the liquid through the ejection port 13 is therefore perfectly stopped upon closing of the needle valve 2. As a result, a risk of liquid leakage during the state in which the needle valve 2 is closed can be securely eliminated.

Moreover, the needle 15 of the needle valve 2 is small in size and volume, and is operated to move back and forth always smoothly and quickly for mechanically opening and closing the ejection port 13 regardless of the magnitude of the liquid pressure. Consequently, not only positive opening and closing of the needle valve 2 but also a good response can be realized.

Figure 8:
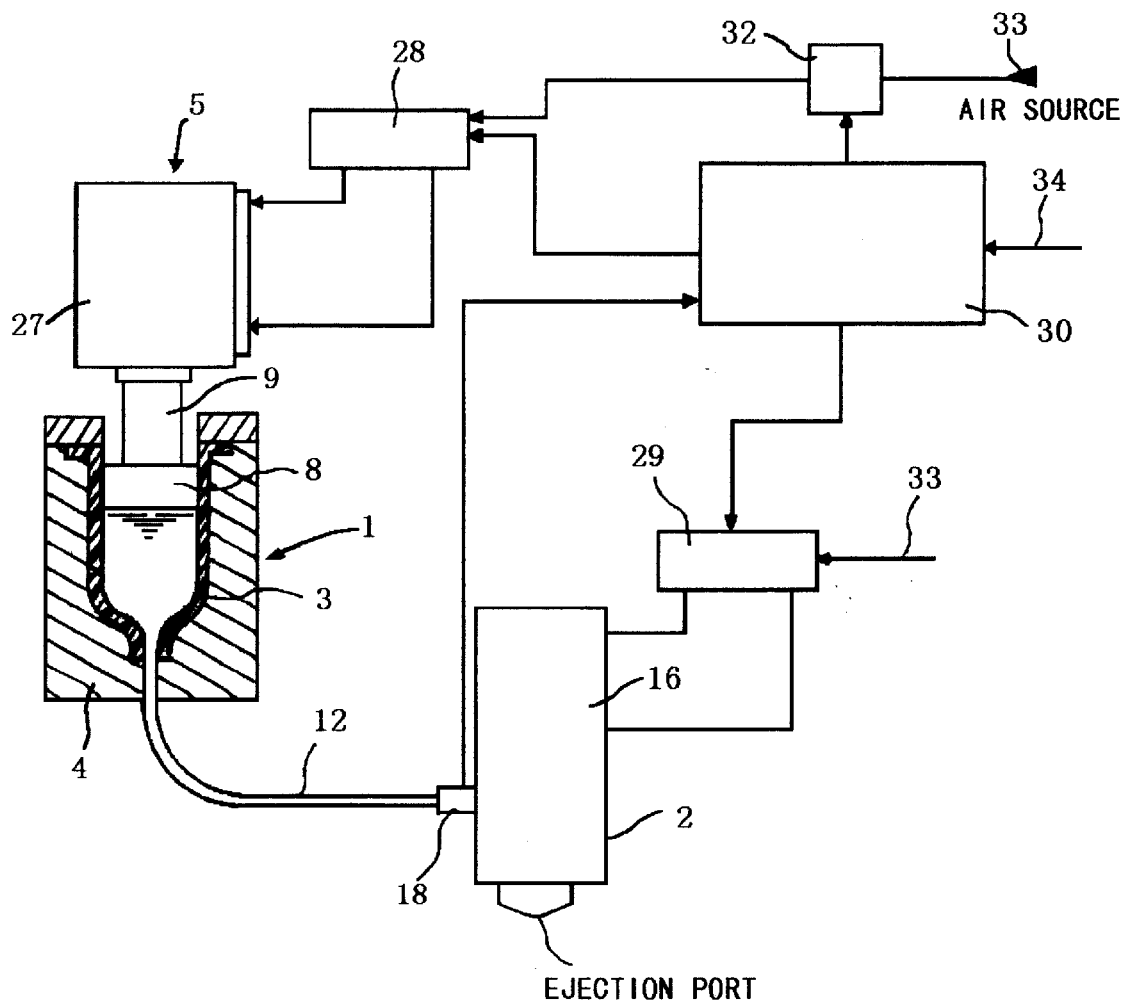
FIG. 8 is a schematic view, sectioned in principal part, of still another embodiment of the method and apparatus for ejecting a liquid in a fixed amount according to the present invention in which an air cylinder is employed as pressurizing means.

FIG. 8 shows still another embodiment of the method and apparatus for ejecting a liquid in a fixed amount according to the present invention.

In this embodiment, a pressure sensor 18 for detecting the liquid pressure is disposed at a position near the ejection port 13 of the needle valve 2 which may or may not include a liquid pressure compensating piston, e.g., at a portion, as shown, from which the liquid flows into the needle valve 2. A detection signal of the pressure sensor 18 is inputted to a control means 30. Based on the pressure to be supplied to the air cylinder 27 and an external setting signal 34 for the liquid pressure, the control means 30 outputs a pressure regulation signal depending on the detected signal from the pressure sensor 18 to a pressure regulating means, preferably an electro-pneumatic regulator 32, which is disposed in a pressurized air supply path.

With the apparatus of this embodiment, when a pressure change during the operation of ejecting the liquid in a fixed amount is detected by the pressure sensor 18, the electro-pneumatic regulator 32 is operated to regulate the pressure supplied to the air cylinder 27. As a result, variations of the liquid pressure can be automatically compensated in accordance with the external setting signal 34.

Furthermore, by modifying the external setting signal 34 itself, the pressure of the liquid supplied to the needle valve 2 can be changed as required.

INDUSTRIAL APPLICABILITY

With the method of the present invention, when ejecting the liquid in a relatively small fixed amount, the pressure in the flow passage after the end of the ejection, particularly the pressure near the ejection port, is controlled to be kept at a predetermined specific value, whereby the subsequent ejection of the liquid can be always performed under the constant flow passage condition. Accordingly, by properly setting the force, time, etc. for pressurizing the liquid in the liquid reservoir, the ejection of the liquid in an amount corresponding to the set values can be repeatedly reproduced with high reliability. On the other hand, when ejecting the liquid in a relatively large fixed amount, in addition to the above control, the pressure of the supplied liquid is controlled also during the ejection of the liquid based on the detected result of the liquid pressure in such a manner, for example, that variations of the detected pressure is kept as small as possible. Consequently, the liquid can be ejected in the fixed amount as intended. Further, by mechanically opening the ejection port of the ejection valve in timed relationship with an increase of the force pressurizing the liquid in the liquid reservoir, the ejection of the liquid can be started without a time lag. In addition, at the end of the ejection, by controlling the ejection valve so as to offset an increase of the pressurizing force and mechanically closing the ejection port of the ejection valve, one cycle of ejecting the liquid in the fixed amount can be ended with positive shutting-off of the liquid without a risk of liquid leakage.

Moreover, with the apparatus of the present invention, since the ejection port of the ejection valve is mechanically opened and closed, positive shutting-off of the liquid at the time of stopping the ejection of the liquid can be more securely achieved without breaking fillers which are sometimes mixed in the liquid, and a leakage of the liquid through the ejection port can be prevented sufficiently. Additionally, by setting the bore diameter of the air cylinder, which serves as means for pressurizing the liquid, to be much larger than the inner diameter of the liquid reservoir, the liquid pressure can be raised up to a required level even when the line air pressure in a general factory is relatively low. As a result, efficiency of the liquid ejecting work can be improved as intended.

By utilizing the features described above, the method and apparatus for ejecting a liquid in a fixed amount according to the present invention can be applied to the case in which it is required to eject a liquid in a fixed amount, the liquid including a viscous fluid and a material having consistency. As one practical example of application, the present invention is applicable to the case of regularly or irregularly coating an electronic material on a board in the form of points and lines in semiconductor manufacturing processes.

What is claimed is:

1. A method of ejecting a liquid in a fixed amount wherein when ejecting the liquid in the fixed amount from a liquid reservoir through an ejection valve, a pressure of the liquid supplied from said liquid reservoir to said ejection valve is controlled by controlling a pressure of the liquid stored in said liquid reservoir so as to keep constant a flow rate of the liquid ejected through and ejection port, and said ejection port is mechanically opened and closed.

2. A method of ejecting a liquid in a fixed amount according to claim 1, wherein the pressure of the liquid supplied from said liquid reservoir to said ejection valve is controlled by controlling a reducing flow rate of the liquid stored in said liquid reservoir for control of the liquid pressure.

3. A method of ejecting a liquid in a fixed amount according to claim 1, wherein the pressure of the liquid supplied from said liquid reservoir to said ejection valve is controlled by controlling a reducing flow rate of the liquid stored in said liquid reservoir constant or variably for control of the liquid pressure.

4. An apparatus for ejecting a liquid in a fixed amount from a liquid reservoir through an ejection valve, said apparatus comprising said liquid reservoir, means for pressurizing the liquid in said liquid reservoir under a pressure depending on viscosity of the liquid, and said ejection valve communicating with said liquid reservoir, wherein said ejection valve has an ejection port mechanically opened and closed, and operation control means is provided to control operation of said pressurizing means and said ejection valve.

5. An apparatus for ejecting a liquid in a fixed amount according to claim 4 wherein said pressurizing means comprises a press member disposed to come into contact with the stored liquid in a liquid tight manner and coupled to an air cylinder having a bore diameter much larger than the inner diameter of said liquid reservoir.

6. An apparatus for ejecting a liquid in a fixed amount according to claim 4, wherein said pressurizing means comprises a press member disposed to come into contact with the stored liquid in a liquid tight manner and coupled to an air cylinder having a bore diameter much larger than the inner diameter of said liquid reservoir, and said operation control means comprises a pressure sensor for detecting a pressure of the liquid near said ejection port and means for operating said pressurizing means in accordance with a signal from said pressure sensor.

7. An apparatus for ejecting a liquid in a fixed amount according to claim 4, wherein said pressurizing means comprises an air cylinder for moving a plunger back and forth which is positioned to enter said liquid reservoir, and said air cylinder has a bore diameter larger than the inner diameter of said liquid reservoir.

8. An apparatus for ejecting a liquid in a fixed amount according to claim 4, wherein said pressurizing means comprises an air cylinder for moving a plunger back and forth which is positioned to enter said liquid reservoir, said air cylinder having a bore diameter larger than the inner diameter of said liquid reservoir, and said operation control means comprises a pressure sensor for detecting a pressure of the liquid near said ejection port and pressure regulating means for regulating a pressure supplied to said air cylinder in accordance with a signal from said pressure sensor.

9. An apparatus for ejecting a liquid in a fixed amount according to claim 4, wherein said pressurizing means comprises an air cylinder for moving a plunger back and forth which is positioned to enter said liquid reservoir, said air cylinder having a bore diameter larger than the inner diameter of said liquid reservoir, and said operation control means comprises a pressure sensor for detecting a pressure of the liquid near said ejection port and an electro-pneumatic regulator for regulating a pressure supplied to said air cylinder in accordance with a signal from said pressure sensor.

10. An apparatus for ejecting a liquid in a fixed amount according to claim 4, wherein said ejection valve comprises a needle valve.

11. An apparatus for ejecting a liquid in a fixed amount according to claim 4, wherein said ejection valve comprises a needle valve provided with a liquid pressure compensating piston.

12. An apparatus for ejecting a liquid in a fixed amount according to claim 4, wherein a liquid flow passage between said liquid reservoir and said ejection valve has a portion extended upward to penetrate a plunger.

13. An apparatus for ejecting a liquid in a fixed amount according to claim 4, wherein said ejection valve is mounted to a manipulator movable in three-dimensional directions.

14. An apparatus for ejecting a liquid in a fixed amount according to claim 4, wherein said apparatus further comprises a control portion for effecting control of said pressurizing means, control of said ejection valve, and control of said manipulator for moving said ejection valve in three-dimensional directions in synchronous relation.

* * * * *